United States Patent [19]

Demol

[11] 4,208,023
[45] Jun. 17, 1980

[54] TAPE TRANSPORT MECHANISM OF MOVABLE FRAME TYPE WITH LATERAL GUIDES

[75] Inventor: Jean-Baptiste Demol, Brussels, Belgium

[73] Assignee: Staar, S.A., Brussels, Belgium

[21] Appl. No.: 912,060

[22] Filed: Jun. 2, 1978

[51] Int. Cl.² .................... G11B 23/10; G11B 15/30
[52] U.S. Cl. .................................... 242/198; 360/96.5
[58] Field of Search ............... 242/198, 199, 200, 201, 242/202, 204; 360/96, 93

[56] References Cited

U.S. PATENT DOCUMENTS

| | | | |
|---|---|---|---|
| 3,578,261 | 5/1971 | Yamamoto et al. | 360/96 |
| 4,065,800 | 12/1977 | Wilson et al. | 242/198 |

FOREIGN PATENT DOCUMENTS 2256061  7/1973  Fed. Rep. of Germany ............. 360/96

*Primary Examiner*—George F. Mautz
*Attorney, Agent, or Firm*—Leydig, Voit, Osann, Mayer & Holt, Ltd.

[57] ABSTRACT

A tape transport for tapes stored in cassettes, where the loading and unloading of the cassette is carried out by a single in-and-out movement of the cassette in its own plane, and where tape and reel drive elements, as the cassette is loaded and unloaded, are brought into and out of penetrative engagement with the cassette in a direction substantially perpendicular to the face of the cassette. The tape transport is of the movable frame type in which a movable frame carrying the tape and reel drive elements is supported on a fixed frame for translation perpendicular to the plane of cassette movement while simultaneously following the in-and-out movements of the cassette. The movable frame is supported on the fixed frame by means of pins projecting into inclined slots in lateral sides of the fixed frame and the movable frame is caused to follow the movements of the cassette, and the tape drive elements are brought into alignment with the cassette openings by intermediate plates which are moved by the cassette and drive the pins along the guide slots translating movements of the cassette into the desired movements of the movable frame.

10 Claims, 5 Drawing Figures

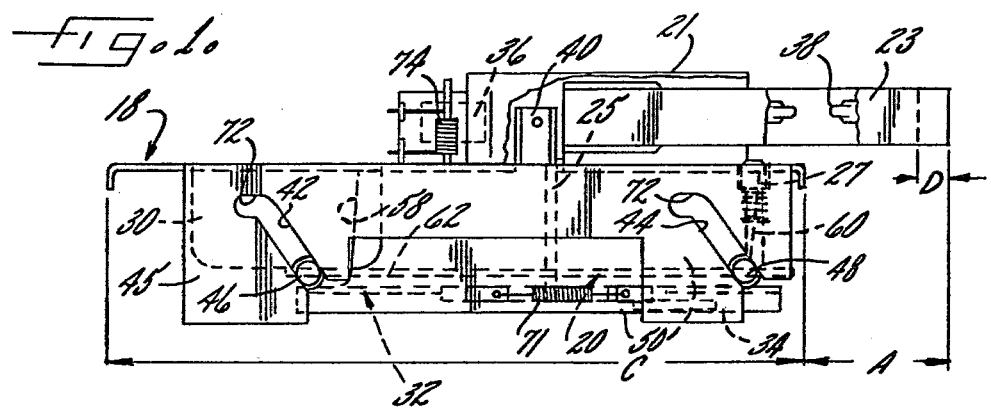

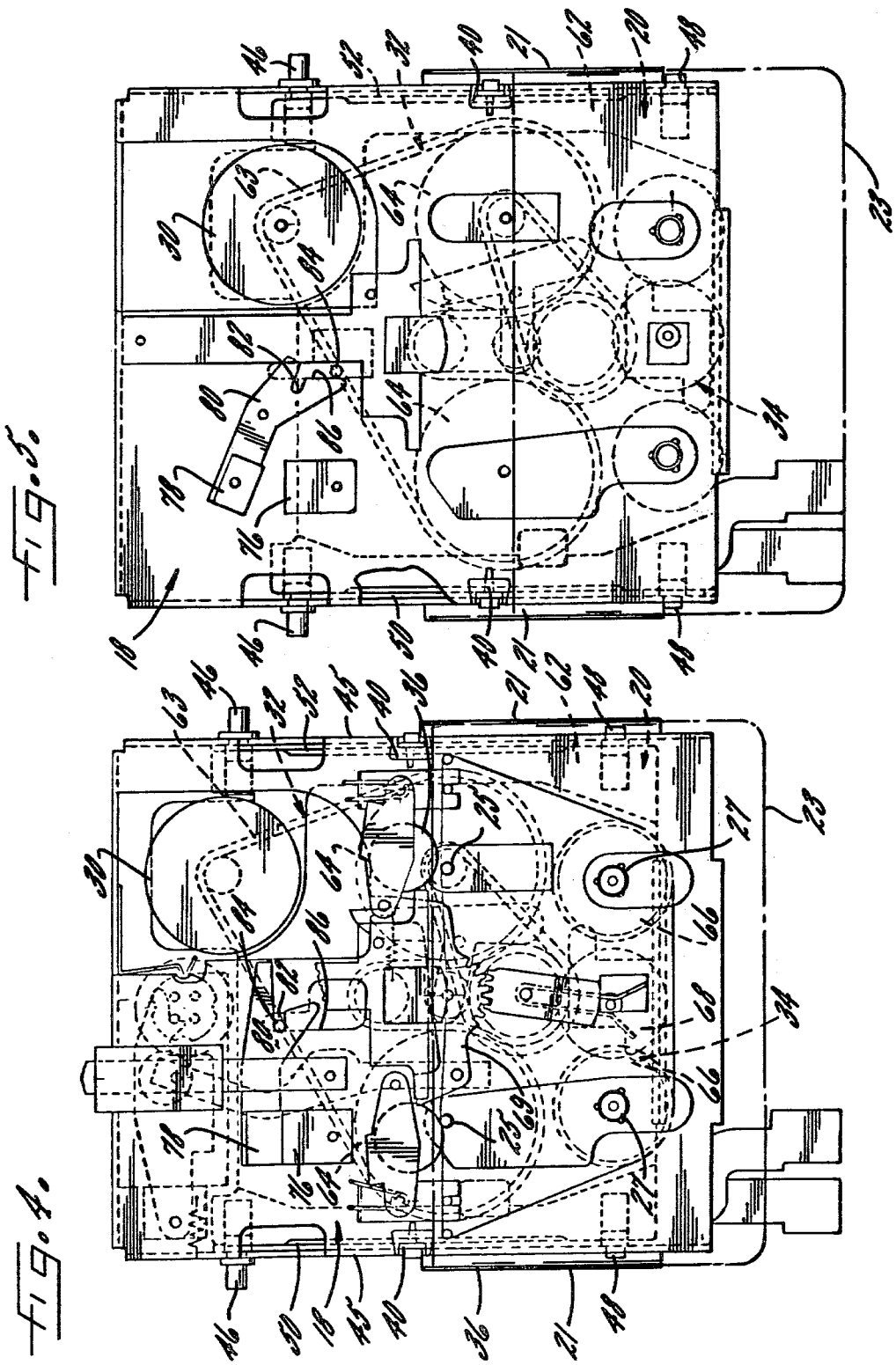

TAPE TRANSPORT MECHANISM OF MOVABLE FRAME TYPE WITH LATERAL GUIDES

This invention relates generally to tape recording and playback apparatus, and more particularly to apparatus for tapes stored in cassettes.

More specifically, this invention concerns improvements in tape transport mechanisms of the general type shown and described in Staar U.S. Pat. No. 3,385,534, in which loading and unloading of the cassette is carried out by a single in-and-out edge-wise movement of the cassette in its own plane.

This type of mechanism is uniquely characterized by a movable frame carrying tape and reel drive elements into operative engagement with the tape and reel hubs in the cassette, in the course of movement of the cassette from unloaded to loaded positions. The movable frame is supported on a fixed frame to follow the in-and-out movements of the cassette, while simultaneously moving perpendicularly relative to the plane of cassette movement to carry the tape and reel drive elements into and out of openings in the face of the cassette.

The requisite simultaneous forward and perpendicular movements of the movable frame relative to the plane of cassette movement, according to Staar U.S. Pat. No. 3,385,534, may be provided by supporting the movable frame by means of a parallelogram linkage (FIG. 1, U.S. Pat. No. 3,385,534) or inclined slots in the lateral sides of the fixed frame receiving rollers on the movable frame (FIGS. 15, 16, U.S. Pat. No. 3,385,534). In both constructions and in commercial forms of the patented mechanism, movement of the cassette to the loaded position when carried out by manual force, is transmitted directly to the movable frame, and that manual force is converted to the desired movement of the movable frame by the parallelogram linkage or the inclined slots in the lateral sides of the frame.

The required perpendicular distance of travel of the movable frame is established by the heights of the capstans and reel drive spindles which must fully penetrate the cassette in the loaded position of the movable frame and be located free and clear of the cassette in the unloaded position of the movable frame, so that the cassette may be removed from the machine. Thus the perpendicular distance which the movable frame travels while it moves forward cannot be reduced below a minimum distance determined by the height of these tape and reel drive elements and the requisite safety clearances.

The required forward distance of travel of the movable frame is established by the configuration of the supporting means for the movable frame on the fixed frame. The movable frame, in addition to the tape and reel drive elements, carries the drive motor and transmission means from the motor to those elements including flywheels, gears and the like, which all considered amount to a substantial weight on the movable frame. When manual force applied horizontally to the cassette is translated by the supporting means to raise the weighted movable frame vertically, it will be seen that the mechanical advantage provided by the supporting means (and friction between the parts) determines whether the manual movement of the cassette between unloaded and loaded positions will be relatively free and easy or resisted and difficult.

With the required vertical distance of travel of the movable frame being fixed by the dimensions of the tape and reel drive elements and the clearances required, providing a supporting means with a greater mechanical advantage will normally reduce the force required to be applied to the cassette since the force will be applied through a longer distance of forward travel of the cassette and the movable frame which moves together with the cassette. Hence, by increasing the mechanical advantage of the supporting means, less force is required to insert the cassette; however, the required forward distance of travel of the movable frame also increases which results in a mechanism with greater overall length. When the tape transport mechanism is mounted in a cabinet, sufficient space must be provided to accomodate the overall length of the mechanism. The problem in fitting tape transport mechanisms in cramped space in a cabinet or behind the dashboard of an automobile becomes severe with units of greater overall length.

It is one of the main objects of this invention to provide a more compact tape transport mechanism of the movable frame type, by reducing the required forward distance of travel of the movable frame between unloaded and loaded positions, while providing a mechanism with a smooth and easy action as the cassette is moved to and from its loaded position.

A more specific object of the invention is to provide an improved means for supporting a movable frame for such a tape transport mechanism and for applying the manual force from the cassette to raise the movable frame in order to carry the tape and reel drive elements on the movable frame into operative engagement with the tape and reel hubs in the cassette.

Another more specific object of the invention is to provide an improved supporting means for the movable frame in the form of guide slots in lateral sides of the fixed frame of such a tape transport mechanism, and to employ intermediate plates having driving and guiding edges cooperating with the guide slots for both transmitting the manual force from the cassette to raise the movable frame and for guiding the movable frame in a simultaneous forward and perpendicular movement so that parallelism between the frames is maintained. A related object is to coordinate the forward and perpendicular movements of the movable frame to align the tape and reel drive elements with the openings in the cassette and to guide these elements into operative engagement with the tape and reel hubs without jamming or catching in the process.

Other objects and advantages of the invention will become apparent from the following detailed description taken in connection with the accompanying drawings in which:

FIG. 1 is a view in side elevation of a movable frame type tape transport mechanism constructed in accordance with the present invention; with the movable frame and cassette in the unloaded position;

FIG. 2 is a view in side elevation of the tape transport mechanism shown in FIG. 1, with the movable frame and the cassette shown in loaded positions;

FIG. 3 is a view in side elevation of one of the pair of intermediate guide and drive plates employed in the mechanism illustrated in FIGS. 1 and 2;

FIG. 4 is a horizontal plan view of the tape transport mechanism shown in FIGS. 1 and 2 and illustrates the mechanism with the cassette and movable frame in the loaded position; and FIG. 5 is a horizontal plan view with certain components of the tape transport mechanism removed, and illustrates the cassette and movable frame in the unloaded position.

Referring to FIGS. 1 and 2, they illustrate a tape transport mechanism constructed according to the present invention. The mechanism, is of the movable frame type shown in Staar U.S. Pat. No. 3,385,534. Thus it has a fixed frame 18 to which are attached guides 21 having grooves or slots into which a cassette 23 is introduced by the operator and which constrain the cassette to a single plane in its movements between unloaded and loaded positions shown in FIGS. 1 and 2, respectively. The tape and reel drive elements 25, 27 of the tape transport mechanism are carried by a movable frame 20 disposed beneath the fixed frame, and are movable into penetrative engagement with openings in the cassette during the course of its movements to loaded position.

When a tape cassette 23 is inserted within the machine in its unloaded position (FIG. 1) the cassette projects from the front of the machine by the distance "A." The cassette is shown in its loaded position in FIG. 2 in which the cassette projects the distance "B" from the front of the tape transport mechanism. One of the features of the present invention is the compactness of the tape transport mechanism in terms of its overall depth, the distance "C" from the back edge of the fixed frame 18 to the very forward most member of the fixed frame of the tape transport mechanism.

Overall compactness lengthwise of such tape transport mechanisms is important where installation space is limited, particularly as found in the cramped compartment behind automobile dashboards and face panels of floor and in-dash consoles.

In carrying out the present invention, the reduced overall depth "C" is obtained by providing supporting means for the movable frame 20 which minimizes the required distance of forward travel of the movable frame to fully load the cassette. In the preferred embodiment of the invention illustrated, the movable frame 20 carries the drive motor 30, the reel drive spindles 27, and the tape drive capstans 25. As shown in FIG. 1, the capstans 25 and reel spindles 27 are driven from the motor 30 by belt and pulley drives 32 and gear drives 34, so that when the capstans and reel drive spindles are in penetrative engagement with the cassette, as shown in FIG. 2, they are located to drive the tape against the pinch rollers 36 and enter the reel hubs 38 to drive the same for recording and playback operations. In the unloaded position of the cassette as shown in FIG. 1, the movable frame 20 is spaced beneath the plane of cassette movement, and the capstans 25 and reel spindles 27 are located below the cassette so that it may be removed and another inserted.

When a tape cassette is inserted and manually pushed from the unloaded position of FIG. 1 to the loaded position of FIG. 2, and thereby introduced into the tape transport mechanism, it is guided in the guides 21, and on being moved forward, the front edge of the cassette engages a pair of upright lugs 40 located on the lateral edges of the fixed frame 18.

According to the present invention, forward and rear pairs of inclined slots 42, 44 in lateral sides 45 of the fixed frame guide the forward and perpendicular movements of the movable frame 20 relative to the fixed frame. For this purpose forward and rear sets of pins 46, 48 are mounted on the movable frame 20 and extend through the slots 42, 44 respectively. To minimize adverse effects due to friction, the pins are preferably of a plastic material such as nylon having a low coefficient of function with the edges of the guide slots 42, 44.

While it has been known heretofore to utilize inclined slots in lateral sides of a fixed frame for supporting the movable frame of a tape transport mechanism, such slots have been formed with an angle of less than about 45° to the plane of cassette movement. It will be appreciated that where the manual force applied to the cassette is translated to upward force for raising the movable frame vertically, the angle of the supporting slots determines the mechanical advantage provided by the supporting means. A mechanical advantage $> |$ is obtained when the angles of the slots are less than 45° relative to the plane of cassette movement.

It is now proposed to form the inclined slots of the movable frame supporting means at an angle greater than about 45° relative to the plane of cassette movement, preferably from about 50° to about 70°. While this has the effect of reducing the mechanical advantage based upon the angle of the slots alone $< |$, it also has the effect desired of reducing the distance of forward travel of the movable frame, between unloaded and loaded positions. Thus, this construction provides a more compact mechanism.

Furthermore, it is now proposed that instead of transmitting the force of inward movement directly from the cassette to the movable frame, as has been common heretofore, such force is transmitted by means of an intermediate member herein shown as later guide plates 50, 52 which act on the support pins 46, 48 for the movable frame with an upward component of force tending to lift the movable frame vertically and assist its having a smooth and easy action in its movements in the fixed frame. For transmitting the force from inward movement of the cassette, to move the movable frame 20 forwardly and vertically, the lugs 40 which are engaged and moved forward by the front edge of the cassette are carried on the lateral, vertically positioned, guide plates 50, 52 which are located inboard and adjacent the lateral sides 45 of the fixed frame 18. The guide plates 50, 52, are mounted for fore and aft movement along the inside wall of the sides 54, 56 and slots are provided at the top of each of the sides 45 of the fixed frame 18 to allow such movement of the lugs 40. As the guide plates 50, 52 are forced forward by the cassette, substantially vertical forward drive edges 58, engage the forward pair of pins 46 extending from the movable frame 20 and drive the pins along the inclined slots 42 to raise the movable frame. The rear set of pins 48 on the movable frame extend through the slots 44 and are guided during the upward movement of the movable frame by the slots and the cooperating rear vertical edges 60 of the lateral guide plates 50, 52. Thus, the forward and rear sets of pins 46, 48 being guided by the slots 42, 44 with the cooperation of the guide plates 50, 52 maintain the parallelism between the frames and alignment between the openings in the cassette and the tape and reel drive elements on the movable frame, as the cassette and movable frame move together from unloaded to loaded positions.

As indicated in FIGS. 1-3, the front and rear edges 58, 60 of each of the lateral guide plates 50, 52 are provided with a slight reverse pitch, herein shown as about 3° and preferably no more than 3°-5°. The slight reverse pitch on the front edges 58 of the guide plates 50, 52 imparts a positive upward component of force to the front pair of movable frame support pins 46, to encourage the desired upward movement of the pins 46 in order to raise the movable frame 20 on the fixed frame. The same slight reverse pitch on the rear edges 60 of the lateral guide plates 50, 52 imparts a positive downward thrust to the rear pair of support pins 48 for the movable frame 20, to encourage the desired downward movement of the pins 48 in order to positively move the movable frame 20 downward and to assist the force of gravity to disengage the tape and reel drive elements from the cassette and eject the cassette upon release of the movable frame from its loaded position.

The movable frame 20 is comprised of an essentially flat plate 62 which extends between the sides 45 of the fixed frame. It is on this plate 62 forming the movable frame 20 that the motor 30 is mounted, connected by a belt 63, to a pair of flywheels 64 journalled on the plate 62 and carrying the capstans 25. The reel spindles 27 are also journalled on the plate 62 of the movable frame, and each is connected to a gear 66 to be selectively driven by means of an intermediate gear 68 included in a gear drive 34 operated by belt and pulley from one of the flywheels. The weight of these various elements including the motor and drives for the capstans and reel spindles is carried by the movable frame, and to raise the movable frame vertically the entire weight of the movable frame 20 and these elements must be raised.

With the movable frame in its raised position shown in FIG. 4, when the motor is operating it rotates the flywheels and capstans counterclockwise. The capstan drive for the tape includes a pair of pinch rollers 36 supported on pivotal mountings. One pinch roller 36 is engaged with its capstan and pinches the tape within the loaded cassette, the outline of the cassette being shown in dash-dot lines. With the capstan drive engaged as shown in FIG. 4, the movement of the tape is from right to left in that Figure. The other pinch roller is disengaged from its capstan by a reversing lever 69 which releases the engaged pinch roller to the action of its spring.

The lever 69 also engages the gear drive 34 to the take-up reel spindle related to the direction of tape movement determined by the engaged capstan drive. Since both capstans 25 rotate in the same direction, in the particular tape transport mechanism disclosed herein, to reverse the direction of tape movement, the motor 30 is reversed and the drive is shifted from one capstan to the other and the drive for the reel spindles is also shifted so that what was originally the non-driven supply take-off reel becomes the driven take-up reel.

Referring to FIG. 4, with the motor and flywheels rotating in the counterclockwise direction, and the tape movement being from right to left in the Figure, the lefthand reel spindle serves as the take-up reel spindle and is driven through gears including the intermediate gear 68.

Turning again to the supporting means for the movable frame 20, to latch the movable frame 20 in the cassette unloaded position, in which the movable frame is shown in FIG. 1, both guide plates 50, 52 have a curved recess 70 (FIG. 3) shaped to fit the adjacent pin 48 in their lower righthand portion at the bottom end of the rear edges 60 which presents a curved upper edge overhanging the pins 48 on the movable frame 20. Thus, with the guide plates 50, 52 pulled toward the unloaded position of the mechanism by tension springs 71 and held in that position as shown in FIG. 1, the pins 48 on the movable frame 20 are effectively latched against upward movement along the inclined slots 44 in the sides of the fixed frame, thus latching the movable frame 20.

To unlatch the movable frame 20, the cassette is inserted on the fixed frame where it comes to bear at its forward edge against the lugs 40, and pushed forward. The initial portion of such forward movement of the cassette indicated by the distance D in FIG. 1, is effective to move the lateral guide plates 50, 52 forward to a position (shown in dashed dot lines in FIG. 3) where the forward drive edges 58 of the guide plates are brought against the adjacent forward pins 46 of the movable frame. The rear vertical edges 60 and recesses 70 of both guide plates 50, 52 are brought forward of the rear pins 48 on the movable frame 20, so that the rear pins 48 are unlatched and free to rise along the inclined slots 44, toward the cross member of the fixed frame.

The forward pair of pins 46 which extend from the movable frame 20, are driven upwards along the inclined slots 42 by the forward edges 58 of the guide plates 50, 52. The vertical movements of the forward set of pins are coordinated by the pair of guide plates 50, 52 which move together responsive to the forward movement of the cassette, and the pair of pins 48 on the rear portion of the movable frame 20 follow the upward movement of the forward pair of pins 46. The rear pair of pins 48 are guided in their upward movement by the walls of the inclined slots 44 and the rear vertical edges 60 on the guide plates 50, 52. The movable frame 20 is thus caused to rise vertically, the movable frame being held level and parallel both fore and aft and laterally with the cross member of the fixed frame, by the cooperative action on the pins 44, 46 by the guide plates 50, 52 and the slots 42, 44 in the fixed frame.

In the course of the vertical movement of the movable frame 20, the tape and reel drive elements 25, 27 carried thereby are caused to enter into penetrative engagement with openings in the main face of the cassette and into operative engagement with the tape and reel hubs. The conventional cassette has a pair of laterally spaced large openings in which the reel hubs are located and a pair of small openings for the capstans, the latter being adjacent the front edge of the cassette.

In addition to providing means for latching the movable frame in its unloaded position, and for positively raising the movable frame, the present invention also provides means for latching the movable frame 20 in its loaded position with the tape and reel drive elements in penetrating engagement with openings in the cassette. For this purpose, the inclined slots 42, 44 in the sides of the fixed frame terminate with a horizontal segment 72 at the upper portion of the inclined slots 42, 44 which all pins 46, 48 on the movable frame 20 enter when the movable frame is fully raised. The horizontal slot segments 72 also provide for a final horizontal cassette movement in which the capstans 25 are pressed against the pinch rollers 36 on the fixed frame (with the tape between) swinging the pinch rollers mounting, on its pivot so that the pinch roller spring 74 becomes active to press the pinch roller 36 against the capstan 25. When the supporting pins 46, 48 are in the horizontal slot segments 72, the movable frame 20 is held firmly against vertical downward movement away from the fixed frame cross member. The movable frame is held with the supporting pins 46 48 at the front ends of the horizontal slot segments 72 by means of a latching electromagnet 76 on the fixed frame, which is energized to hold an armature 78 attached to a pivotal latch plate 80. A slot 82 is provided in the latch plate 80 for entry of a pin 84 carried by the movable frame 20 and slidable in a fore and aft slot 86 in the cross member of the fixed frame until it enters the slot 82 in the latch plate 80. The entry of the pin 84 into the slot 82 of the latch plate 80 pivots the plate 80 to bring its armature 78 against the latching electro-magnet 76. When the electro-magnet is energized, it will hold the armature 78 and by means of the latch plate 80 will latch the pin 84 and thus the movable frame 20 against return movement of the movable frame.

To release the movable frame 20 and allow it to fall along the inclined slots 42, 44 from the raised-loaded position, the circuit of the latching electro-magnet is opened to de-energize the electro-magnet 76 and release its armature 78 and the latch plate 80; in the course of such downward movement away from the cross member of the fixed frame, the movable frame disengages the tape drive capstans 25 and reel drive spindles 27 from engagement with the tape and reel hubs within the cassette, moving away from the cassette in a direction substantially perpendicular to the main face of the cassette.

Thus it will be seen, that both the entry of the tape and reel drive elements into the openings of the cassette, and the removal of such tape and reel drive elements from the openings in the cassette, is along a substantially straight path substantially perpendicular to the face of the cassette. This is to avoid jamming of the elements against the parts of the cassette on entry, and likewise to obtain their clean release from the tape and reel hubs. The initial movement of the movable frame towards the unloaded position from the loaded position is horizontal, and in the course of this movement the capstans are moved in a direction away from the pinch rollers, which are restrained against following the movement of the cassette, so that the capstans and pinch rollers are separated and the tape is freed from being pinched between such drive members. Following the initial horizontal movement of the movable frame and cassette, the movable frame begins its movement downward away from the cross-member of the fixed frame and causes the tape and reel drive elements to be removed from the openings in the face of the cassette.

To the extent that the driving and guiding edges 58, 60 on the lateral guide plates 50, 52 diverge from straight edges perpendicular to the plane of cassette movement, the movable frame will not exactly follow the cassette during its in-and-out movement. The guide plates 50, 52, where such angular divergence from perpendicularity is present, will move a slightly different linear distance, depending on the direction and extent of inclination from the perpendicular, as compared with the distance moved by the movable frame. It is preferred, as stated above, to provide driving and guiding edges 58, 60 which diverge from being exactly perpendicular by having a small reverse pitch on the order of 3°–5° in order to obtain an additional mechanical advantage to that provided by the angle of the guide slots as well as a small but appreciable component of force acting on the movable frame support members 46, 48 in the upward direction when the fixed frame is mounted with the cassette plane being horizontal, and tending to assist the smooth easy action of the movable frame.

In order to accommodate this slight angular divergence of the driving and guiding edges on the lateral guides 50, 52 and the resulting difference between the distance moved by the cassette and the movable frame, the cassette is initially aligned on the fixed frame 18 a slight distance away from exact vertical alignment with the tape and reel drive elements 25, 27 on the movable frame. Because the difference in distance moved is extremely slight, the openings in the cassette are sufficiently oversize compared with the capstans and reel drive spindles to allow them to enter the openings even though not exactly aligned. The difference in distance is taken up during the course of the movement of the cassette and the movable frame to the fully loaded positions. As herein shown, the location of the lugs 40 on the lateral guide plates 50, 52 is such that with the cassette in its position after movement of the distance "D" to unlatch the movable frame, the axis of the openings in the cassette are slightly ahead of the vertical axes of the capstans 25 and reel drive spindles 27, although still generally aligned. As the movable frame approaches the cassette, responsive to forward movement of the cassette, the capstans and reel drive spindles are brought into exact alignment with the corresponding cassette openings, and enter into operative engagement with the tape and reel hubs as the cassette and movable frame reach the fully loaded position.

I claim as my invention:

1. In a tape transport mechanism for tapes stored in cassettes, said mechanism being of the type having a fixed frame with lateral sides, and a movable frame carrying tape and reel drive elements, supported between said sides of said fixed frame for translation of said tape and reel drive elements together with and substantially perpendicular to the cassette to penetrate and leave the cassette in the course of the in-and-out movement of the cassette in its own plane between unloaded and loaded positions, the improvements comprising:

means for supporting said movable frame including guide slots inclined more than 45° and less than about 75° to the plane of cassette movement formed in said lateral sides of said fixed frame, and support members extending from the opposite sides of said movable frame and movable in said guide slots; and lateral guide plates movable parallel to said plane responsive to the movement of the cassette to its loaded position, said guide plates having driving edges inclined in the opposite direction to said guide slots at an angle of 87° or less relative to said plane of cassette movement, and means on said movable frame engaged by said driving edges for moving said support members along said guide slots and said movable frame to translate said tape and reel drive elements to penetrate the cassette.

2. In a tape transport mechanism, the improvements according to claim 1, wherein said support members extending from said movable frame comprise said means engaged by said driving edges on said lateral guide plates for moving said support members along said guide slots.

3. In a tape transport mechanism, the improvements according to claim 1, wherein said movable frame is supported parallel with the plane of cassette movement and provided with front and rear support members, said sides of said fixed frame are provided with front and rear sets of slots receiving said support members, and said driving edges are provided at the front of said lateral guide plates for cooperation with said front support members on said movable frame to drive said members along said front set of guide slots, and guiding edges are provided at the rear of said lateral guide plates for cooperation with said rear support members on said movable frame for guiding said support members along said rear set of guide slots, and maintaining said movable frame parallel with said plane throughout the course of its movement.

4. In a tape transport mechanism, the improvements according to claim 3, wherein said guide plates provide means for latching said rear support members to hold said movable frame against movement in the unloaded position of the cassette, and for unlatching said rear support members responsive to initial movement of a cassette toward the loaded position.

5. In a tape transport mechanism, the improvements according to claim 1, wherein said movable frame is supported by forward and rear support members, said sides of said fixed frame are provided with forward and rear sets of slots receiving said support members, and said lateral guide plates are provided with forward edges for driving said forward support members along said forward set of guide slots, and with rear edges for guiding said rear support members along said rear set of guide slots, upon forward motion of said lateral guide plates.

6. In a tape transport mechanism, the improvements according to claim 5, wherein said lateral guide plates are movable in a forward motion responsive to movement of the cassette to the loaded position and in a return motion with the return of the cassette, said rear edges of said lateral guide plates cooperating with said rear support members during such return motion to positively move said movable frame and the tape and drive elements carried thereby perpendicularly away from the cassette.

7. In a tape transport mechanism, the improvements according to claim 6 further including spring means opposing the forward motion of said lateral guide plates and assisting the return motion of said lateral guide plates and the positive movement of said movable frame away from the cassette.

8. In a tape transport mechanism, the improvements according to claim 3, and means for holding said support members to latch said movable frame in the loaded position or the unloaded position of the cassette.

9. In a tape transport mechanism, the improvements according to claim 3, wherein said guide plates provide means for holding said rear support members in said rear slots to latch said movable frame against movement in the unloaded position of the cassette, and for releasing said rear support members to unlatch said movable frame responsive to initial movement of a cassette toward the loaded position.

10. In a tape transport mechanism, the improvements according to claim 9, wherein said means for holding and for releasing the rear support members comprises the guiding edges at the rear of said lateral guide plates defining curved recesses presenting curved upper edges overhanging the rear support members in the unloaded position of the cassette, the curved upper edges being movable from said overhanging positions in response to initial movement of a cassette toward the loaded position.

* * * * *